UNITED STATES PATENT OFFICE.

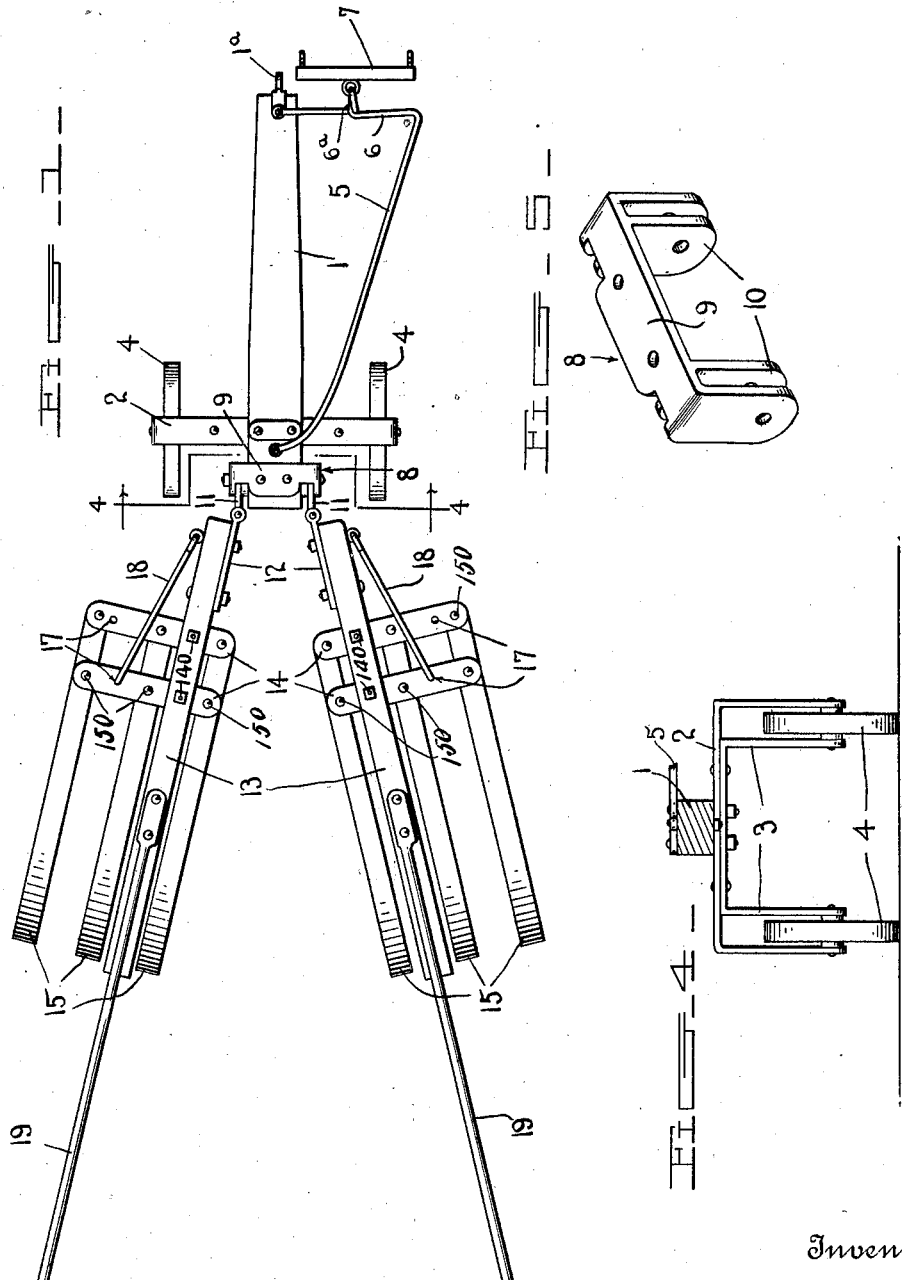

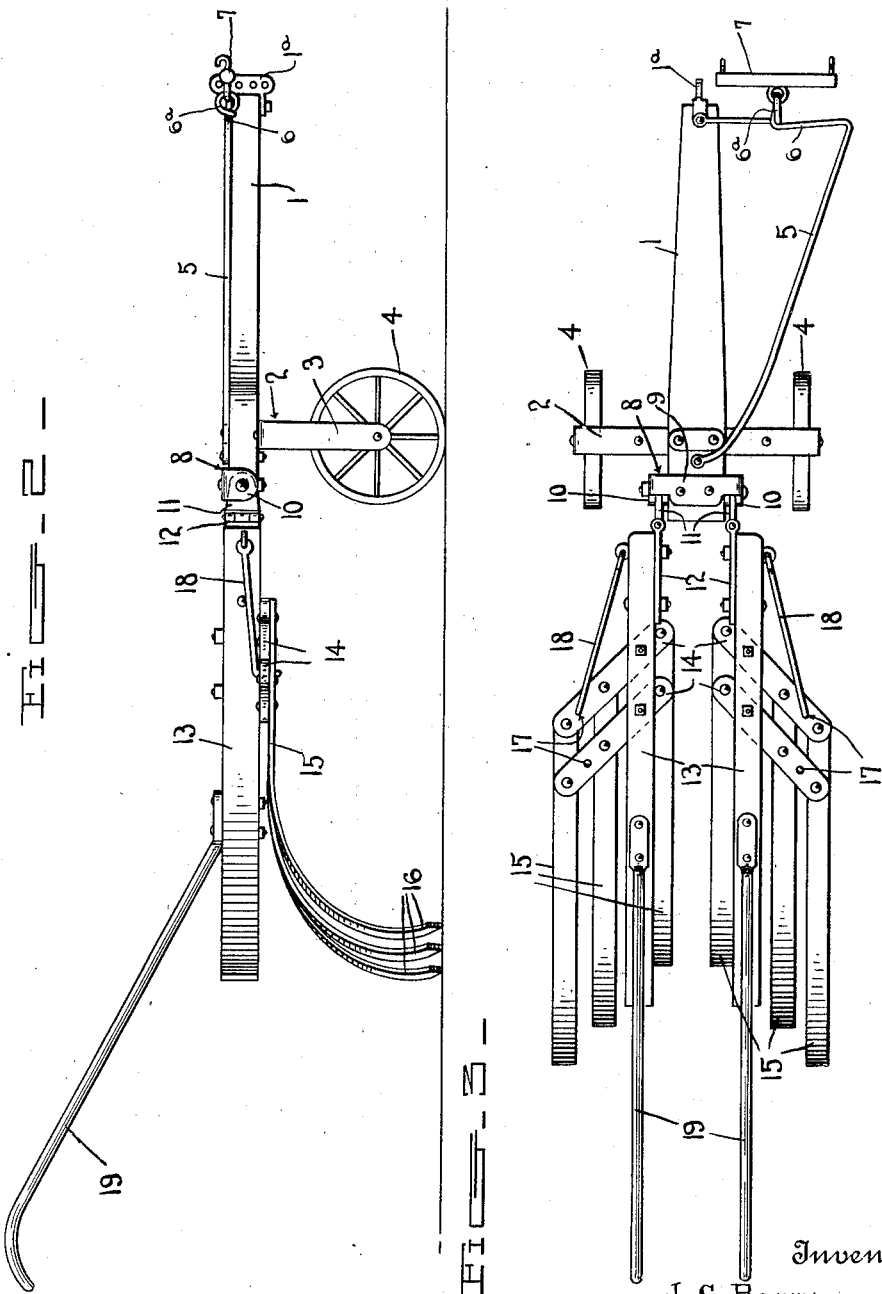

JOEL CLARENCE BERRY, OF GREER, SOUTH CAROLINA.

CULTIVATOR.

1,003,394.  Specification of Letters Patent.  Patented Sept. 12, 1911.

Application filed March 6, 1911. Serial No. 612,455.

*To all whom it may concern:*

Be it known that I, JOEL CLARENCE BERRY, a citizen of the United States, residing at Greer, in the county of Greenville and State of South Carolina, have invented certain new and useful Improvements in Cultivators; and I do declare the following to be a full, clear, and exact description of the invention, such as will enable others skilled in the art to which it appertains to make and use the same.

This invention relates to improvements in cultivators.

The object of the invention is to generally improve the construction of cultivators with a view to ease of assemblage of the parts and the separation thereof for repair or replacement.

With this and other objects in view the invention consists of certain novel features of construction, combination and arrangement of parts as will be more fully described and particularly pointed out in the appended claim.

In the accompanying drawings: Figure 1 is a plan view of my improved cultivator; Fig. 2 is a side view of the same; Fig. 3 is a plan view showing the sets of cultivating blades brought together in parallel relation and the blades adjusted to bring the same closer together; Fig. 4 is a vertical cross sectional view on the line 4—4 of Fig. 1; Fig. 5 is a detail perspective view of the stationary coupling member for the cultivator beams.

Referring more particularly to the drawings, 1 denotes the main draft beam of the cultivator, to which near its inner end is rigidly secured an arch frame 2, said frame being here shown and is preferably constructed from two flat metal bars which are riveted or otherwise secured together and have their ends bent downwardly at right angles and spaced apart in parallel relation to form forks 3 in the lower ends of which are revolubly mounted beam supporting wheels 4.

Secured to the beam 1 is a draft rod 5 said rod having its inner end connected to the draft beam near the inner end thereof as shown. The rod 5 is bent at an angle at its outer end as at 6 and in said angular portion is formed an eye 6ª. The inner end of the angular portion 6 of the rod is connected at its end to the draft beam and the eye 6ª is thus offset from the beam. To the eye is attached a swingletree 7 or other suitable draft device. By thus arranging the draft rod the draft animal is permitted to walk between or to one side of the rows of plants without causing a side draft or pull on the cultivator. The beam 1 has also arranged on its outer end a clevis 1ª whereby the cultivator may be drawn in the usual manner or two horses hitched thereto.

On the inner end of the draft beam 1 is bolted a coupling member 8 comprising a plate 9 having on its opposite ends pairs of depending parallel pivot lugs 10 between which are pivotally connected the forward members 11 of universal joint connections, said members being in the form of flat plates to the rear edges of which are hingedly connected the rear members 12 of the universal joint connection, said members being also in the form of flat plates to which are bolted or otherwise secured the forward ends of cultivator beams 13.

To the under side of each beam 13 are connected by means of pivots 140 intermediate their ends, a pair of blade-supporting bars 14, one of each of said bars being in advance of the other and the major portion of each bar lying on the outside of the beam owing to the location of its pivotal connection to one side of its mid-length.

To the under sides of the bars 14 are connected cultivator blades 15 by means of pivots 150 which connection not only supports the cultivator blades, but also maintains the bars 14 in parallel relation to each other no matter to what angles with the beam they may be turned and also maintains the cultivator blades 15 in parallel relation to each other and to the particular beam to which the bars 14 may be attached, notwithstanding the fact that the bars 14 of each pair are freely and conjointly movable, on their pivots 150 to positions at different angles to the beam and to the blades. The angles to which the bars 14 are adjusted, while not affecting the parallelism of the blades 15, will determine the distance of the blades from each other and I have provided means for securing the bars 14 in two adjustments, to wit, that at right angles to the beam as illustrated in Fig. 1, and that at inclinations thereto, as shown in Fig. 3, said means consisting of holes 17 in the beams 14, one in each beam of each pair, and a hook 18 attached loosely to each beam.

In the right angular positions of Fig. 1, the hooks 18 are engaged in the holes 17 of the rear bar 14 of each pair and the blades are rigidly held in their positions farthest apart from each other, while in the positions of Fig. 4 the hooks 18 are engaged in the holes of the forward bar 14 of each pair rigidly maintaining the blades in positions nearer to each other. Any suitable or desired number of holes 17 may be provided in the bars 14 whereby there may be provided any desired number of adjustments of the distance of the blades apart, and in any and all of such adjustments, the blades will always maintain their parallelism, always remain parallel with the beam, and always be rigidly secured in their adjusted positions.

To the beams 13 are secured the inner ends of rearwardly projecting handles 19 by means of which the beams and the cultivating blades carried thereby may be lifted together or independently to avoid any obstructions in the path of the same and may be swung apart laterally to a greater or less extent according to the size of the plants in the rows which are being cultivated. By providing the supporting wheels 4 and the connecting draft devices as herein shown and described the draft or pull of the machine will be very light and the cultivating beams may be very easily handled.

A cultivator constructed in accordance with my invention may be employed in any capacity where an ordinary cultivator is used and will be found to possess many advantages over the ordinary form of similar implements.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention, what I claim is:

A cultivator comprising a draft beam, a coupling member secured upon the near end thereof comprising a flat plate secured upon the top of the beam, and provided with a right angled depending flange on each side of the beam and a second right angled depending flange outside of and spaced apart from each corresponding first named flange, both pairs of flanges and the beam having registering transverse openings, a pair of cultivator beams carrying cultivator blades and having coupling members on their forward ends inserted between the pairs of flanges on opposite sides of the beam, and provided with vertical and transverse pivots, the transverse pivots passing through the flanges and the coupling members, and the vertical pivots connecting the coupling members with the cultivator beams.

In testimony whereof I have hereunto set my hand in presence of two subscribing witnesses.

JOEL CLARENCE BERRY.

Witnesses:
J. E. BROCKMAN,
S. L. ROGERS.

Copies of this patent may be obtained for five cents each, by addressing the "Commissioner of Patents, Washington, D. C."